Aug. 24, 1965  H. C. PEARSON  3,202,189
SAW APPARATUS
Filed Nov. 29, 1962  2 Sheets-Sheet 1

Harry C. Pearson
INVENTOR.

BY
Ramsey, Kolisch + Hartwell
Attys

Aug. 24, 1965
H. C. PEARSON
3,202,189
SAW APPARATUS
Filed Nov. 29, 1962
2 Sheets-Sheet 2
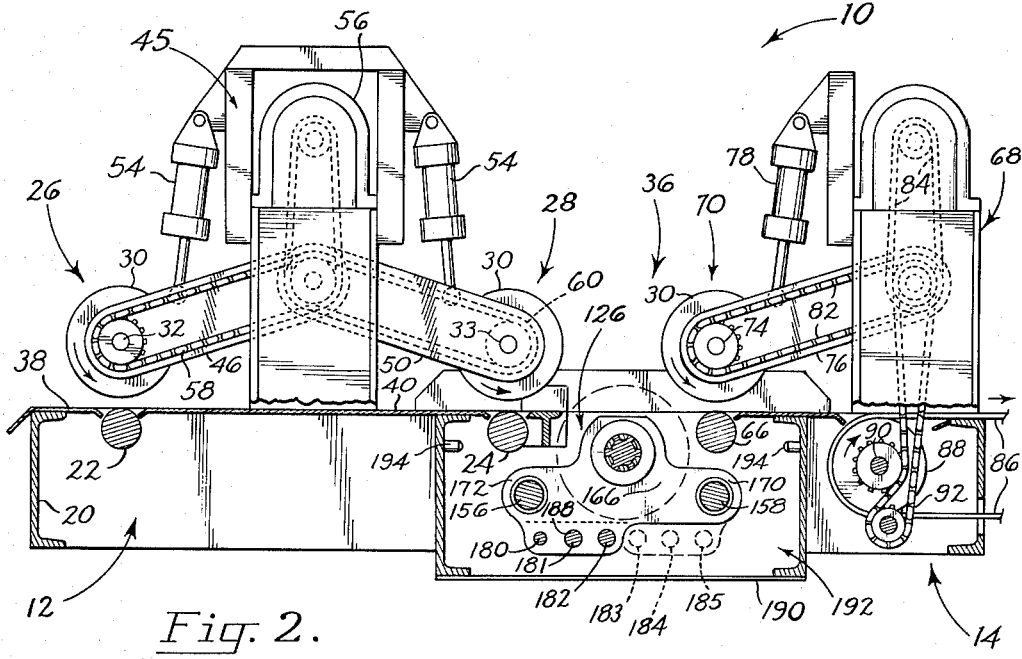
Fig. 2.
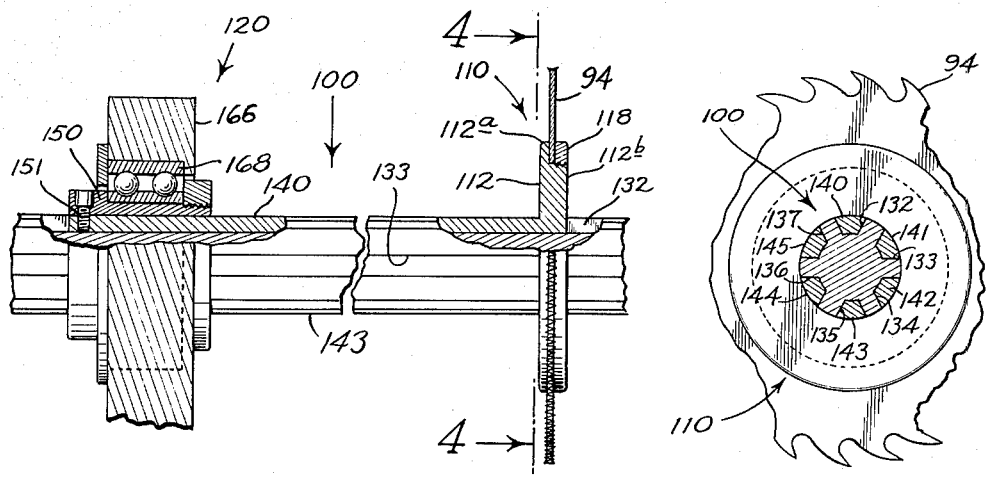
Fig. 3.
Fig. 4.
Harry C. Pearson
INVENTOR.
BY
Ramsey, Kolisch + Hartwell
Attys.

United States Patent Office 3,202,189
Patented Aug. 24, 1965

3,202,189
SAW APPARATUS
Harry C. Pearson, Portland, Oreg., assignor to Portland Iron Works, Portland, Oreg., a corporation of Oregon
Filed Nov. 29, 1962, Ser. No. 240,824
10 Claims. (Cl. 143—37)

This invention relates to saw apparatus, and more particularly to saw apparatus including one or more saws mounted on an arbor with such saws laterally adjustable on the arbor. Exemplary of saw apparatus of this sort is a ripsaw machine including one or more circular saws that are adjusted laterally of each other to change the width of the boards cut by the machine. The invention is described below in connection with a ripsaw machine, but it should be understood that this is done for purpose of illustration, and that certain features of the invention may have a wider application.

In a conventional lumber mill operation, it is common to send boards from a feed table into a ripsaw machine, where adjustable saws in the machine trim off waste and cut boards of selected widths. A factor in obtaining maximum selectivity in the widths of boards cut is the minimum spacing between adjacent saws permitted by the machine. A serious disadvantage of many constructions known to date is that any mechanism provided for shifting the saws has such bulk in the vicinity of the saws that it is impossible to position the saws in a closely adjacent position. Thus, to obtain narrowly cut boards, it is necessary either to pass the boards through the same apparatus twice, with the boards in the second pass cut to the final dimension desired, or to provide in the ripsaw machine multiple arbors with separate sets of saws on each arbor. With the latter arrangement, the saws on one arbor are adjustable to positions that are staggered with respect to the positions of the saws on the other arbor, and narrow cutting is possible. Both of these alternatives, however, have disadvantages. Passing boards repeatedly through the saw apparatus increases the cost of handling them. Providing multiple arbors and multiple sets of saws on these arbors adds considerably to the cost of the equipment.

Thus, a general object of the invention is to provide novel saw apparatus, which features a unique mounting for one or more adjustable saws therein, with such mounting accommodating greater selection in the position of the saw or saws than possible with prior known types of devices.

Another object is to provide such saw apparatus, featuring improved selectivity in saw positioning, with such produced in an entirely practical and satisfactory manner.

In saw apparatus with multiple saws mounted on an arbor, where such saws are shiftable along the arbor, in order to accommodate positioning of all the saws in multiple positions, the arbor must have considerable length. Problems are introduced when the arbor is rotated, in that gyrations and other movements occur if the arbor is not properly supported. Another object of the invention is to provide a novel construction for saw apparatus, including a power-driven saw arbor, that includes novel means for supporting the arbor, making it entirely stable when the saw apparatus is in use and the arbor rotating.

Another object of the invention is to provide adjustable saw apparatus, including an arbor, which further comprises a mounting for each saw in the apparatus (more specifically a collar mounted on the arbor), saw-shifter mechanism positioned axially from the mounting (also mounted on the arbor), and means interconnecting the saw-shifter mechanism and mounting, whereby on axial movement of the former a corresponding axial movement is produced in the latter.

The means contemplated in an embodiment of the invention for connecting a saw-shifter mechanism and a saw mounting comprises a rigid, compression-transmitting shifter bar extending along the saw arbor on the outside thereof. Because of the rigid nature of the bar, on movement of the shifter bar in either of opposite directions, the saw mounting is also moved. The bar, although disposed on the outside of the arbor, because it is rigid remains close to the arbor on rotation of the arbor without being thrown out under the action of centrifugal force. The exterior mounting of the bar enables a solid arbor to be used, of maximum strength. The latter is important, of course, in producing proper rigidity in the arbor.

Yet another object of the invention is to provide a construction of the type indicated above, where channels are provided along the length of the arbor for seating the rigid shifter bars. Such channels enable the shifter bars to be mounted with the outer sides thereof below the circumferential outline of the saw arbor.

A further object is to provide means for shifting a saw on an arbor, that comprises an external key mounted in a keyway provided on the outside of the arbor. The key transmits rotation of the arbor to the saw mounting, and also serves as a means for shifting the saw mounting axially.

Another object of the invention is to provide novel means for supporting a power-driven saw arbor, comprising a guide (more specifically a shaft) spaced radially to one side of the arbor and paralleling the arbor, and supporting means or members mounted on the arbor and guide whereby one braces the other.

An object related to the one above is to provide such means for supporting a power-driven saw arbor, where the supporting members also function as shifter mechanisms for shifting adjustable saw mountings.

And yet another object is to provide saw apparatus of the type indicated above, which is well lubricated at all times, and which enables accurate positioning of saws therein, with a minimum amount of discrepancy in saw positioning because of friction impeding free movement of various supporting parts.

These and other objects and advantages are attained in the invention, and the same is described hereinbelow in conjunction with the accompanying drawings, wherein:

FIG. 2 is a cross-sectional view, taken generally along the line 2—2 in FIG. 1, further illustrating the ripsaw machine;

FIG. 3 is a view, partially in section, and on a somewhat larger scale, illustrating portions of a saw arbor in the machine, and mechanism provided for shifting a saw on the arbor; and FIG. 4 is a cross-sectional view, taken generally along the line 4—4 in FIG. 3.

Figure 1:
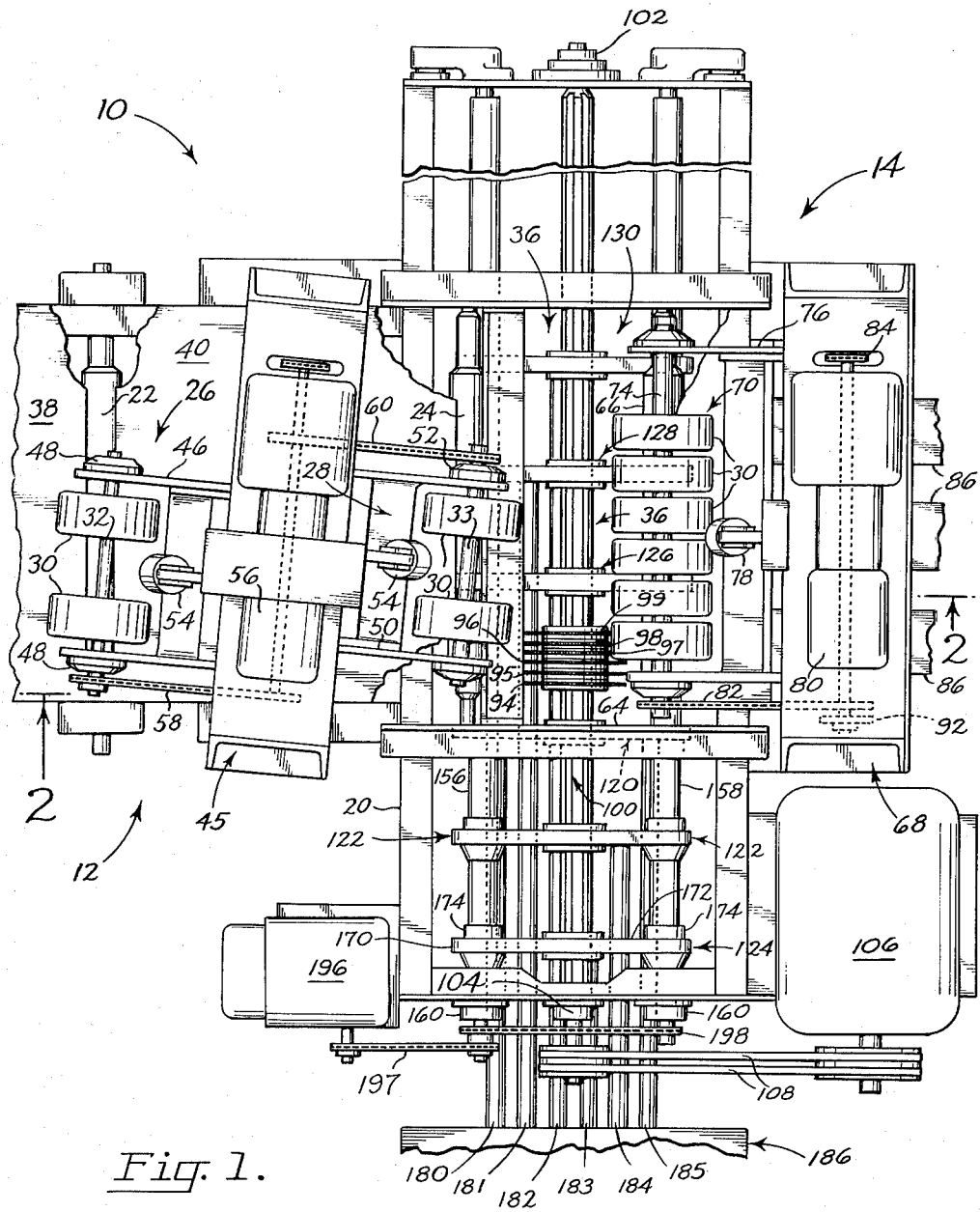
FIG. 1 is a plan view of apparatus constructed according to one embodiment of this invention, such comprising a ripsaw machine including a sawing station with plural, laterally adjustable saws mounted in the sawing station.

As already generally indicated, an application of the invention resides in the construction of a ripsaw machine, such as may be used in the lengthwise cutting of lumber into boards of desired width. In FIGS. 1 and 2, a ripsaw machine is indicated generally at 10. At the left of these figures there is illustrated feed end 12 of the apparatus, and at the right of the drawings is illustrated off-bearing end 14. Ordinarily, in conjunction with the machine shown, there is provided a feed table for delivering lumber into the machine, with such traveling lengthwise into feed end 12. Such a feed table has not been illustrated, as it was not considered necessary to do so for an understanding of the invention.

Ripsaw machine 10 comprises a frame 20, ordinarily

«END» supported at a suitable elevation above the ground. Considering first the construction of the feed end of the machine, journaled in frame 20 and extending transversely of the path of lumber into the machine are bottom rollers 22, 24. Positioned above these bottom rollers are first and second feed roller mechanisms, indicated at 26 and 28, respectively.

Each of the feed roller mechanisms may comprise, as in the embodiment of the invention illustrated, plural rubber-tired wheels 30, secured to a suitably driven shaft. Thus, wheels 30 of mechanism 26 are shown secured to a shaft 32, and wheels 30 of mechanism 28 are shown secured to a shaft 33.

Boards on traveling into the apparatus travel over the bottom rollers, and with the rubber-tired wheels rotated under power, they are urged forwardly by the roller mechanisms into a sawing station 36 of the machine. Extending out to either side of the supporting rollers are guide plate portions 38, 40. These guide plate portions may at times guide portions of the boards as they travel between the rollers. They also inhibit debris from falling downwardly into the apparatus.

Considering with more particularity the mounting for wheels 30 in the machine, at 45 there is indicated an upstanding mounting which is secured to frame 20. Extending out to the left of mounting 45 (in FIGS. 1 and 2) is a pivoted support structure 46. Support structure 46 is provided at the nonpivoted or free end thereof with bearings 48, within which shaft 32 of roller mechanism 26 is journaled. Extending out to the right of mounting 45 is another pivoted support structure 50. Shaft 33 of roller mechanism 28 is journaled within bearings 52 mounted at the free end of this support structure.

The nonpivoted ends of the two pivoted support structures are urged downwardly by extensible rams or jacks 54 interposed between the support structures and mounting 45. Shafts 32, 33 of the roller mechanisms 26, 28 are driven under power, by means of a motor 56 mounted on the mounting 45, having an output shaft connected to shafts 32, 33 by chains 58, 60.

Sawing station 36 includes a fence or guide 64 extending along one side thereof. It should be noted that wheels 30 of feed roller mechanisms 26, 28 are toed inwardly with respect to fence or guide 36. Because of this angular position of the wheels, boards traveling into the cutting station have their side edges forced against guide 64.

Considering now the off-bearing end of the ripsaw machine, a bottom roller is indicated at 66, having ends journaled in frame 20 and paralleling rollers 22, 24. Mounted on the frame 20 is an upstanding mounting 68. A roller mechanism 70, comprising rubber-tired wheels 30 secured to a shaft 74, is journaled in the free or nonpivoted end of a support structure 76 pivoted on mounting 68. Ram or jack 78, connected to the pivoted support structure and to mounting 68, urges structure 76 downwardly, thus to cause wheels 30 of roller mechanism 70 to press boards against roller 66. Roller mechanism 70 is rotated under power, by means of a motor 80 mounted on mounting 68, which has its output shaft connected to shaft 74 by chains 82, 84.

Off-bearing conveyer belts, for moving cut boards out of the ripsaw machine, are indicated at 86 (see FIG. 2). These are trained over power-driven pulleys, such as pulley 88, which are mounted on a shaft 90. Shaft 90 is driven by motor 89, through a chain 92.

Sawing station 36 has already been discussed briefly. This station includes a plurality of circular saws (in the embodiment illustrated, six are shown, and these are indicated at 94, 95, 96, 97, 98, and 99), mounted on a power-driven, rotatable saw arbor 100. Arbor 100 is disposed normal to the path of travel for boards through the sawing station. The saws are shiftable with respect to fence or guide 64, and to change the spacing between the saws. With such an adjustment in the position of the saws, the width of the boards cut in the sawing station may be varied.

Considering now details of the sawing station and associated structure, and reference is now made to FIGS. 3 and 4 as well as FIGS. 1 and 2, saw arbor 100 is journaled on frame 20, in bearings 102, 104. The arbor is rotated under power, by means of a motor 106 which is connected to arbor 100 to drive the arbor by drive belts 108.

Each of the saws 94–99 is mounted on arbor 100 through a collar or saw mounting, such as the collar or mounting 110 illustrated in FIGS. 3 and 4. The collar or mounting includes an annular portion 112 encircling the arbor and a detachable nut portion 118. Annular portion 112 is bounded by a radially outwardly extending flange portion 112a. Also part of portion 112 is a threaded hub portion 112b.

A saw is mounted on a collar 110, with one face of the saw lying against flange portion 112a. Nut portion 118 screwed onto threaded portion 112b abuts the other face of the saw and clamps the saw firmly in place.

A shifter mechanism is provided for each saw (more particularly the collar or mounting that mounts the saw), for shifting the saw axially on the saw arbor in either of opposite directions. Thus, and with reference to FIG. 1, the bottom three saws 94, 95, 96 in the figure are shifted by shifter mechanisms indicated at 120, 122, and 124 (these shifter mechanisms being located on one side of the ripsaw machine). The other three saws (i.e., saws 97, 98, and 99) are shifted in position by shifter mechanisms 126, 128, and 130 (located on the opposite side of the ripsaw machine).

As best shown in FIGS. 3 and 4, arbor 100 is splined, i.e., provided with elongated keyways or channels extending axially therealong. Such keyways are indicated in FIG. 4 at 132–137. Fitted within these keyways are elongated, rigid (and thus tension- and compression-transmitting) keys, such as keys 140–145 shown in FIG. 4, also referred to herein as shifter bars. A pair of such keys or shifter bars interconnects each shifter mechanism and one of the saw mountings or collars. The keys, since they are seated within the keyways, constitute not only a means for shifting the saws laterally, but also a means for transmitting rotation of the saw arbor to the saw mountings connected to keys.

Considering particularly the shifter mechanism 120 and saw mounting for saw 94 illustrated in FIG. 3, keys 140, 143 on diametrically opposite sides of the saw arbor (and extending along corresponding keyways) have one set of ends joined to collar 110. Their other set of ends are joined to an inner part 150 of shifter mechanism 120, by screws such as the screw 151 illustrated. Movement of shifter mechanism to the right or left in FIG. 3 produces a corresponding movement in collar 110.

The collar or mounting for saw 95 in FIG. 1 is connected to shifter mechanism 122 through a similar pair of diametrically opposed keys, which are spaced circumferentially on arbor 100 from the pair of keys interconnecting mechanism 120 and the mounting for saw 94. Similarly, the mounting for saw 96 is connected to shifter mechanism 124 by means of still another pair of keys spaced circumferentially on arbor 100 from the pairs connected to mechanisms 120, 122. The keys connected to the outer shifter mechanisms pass through the inner shifter mechanisms with these inner shifter mechanisms being movable to and fro with respect to the keys passing therethrough.

Shifter mechanisms 126, 128, 130 on the other side of the ripsaw machine are connected to the saw mountings for saws 99, 98, 97, by means of keys interconnecting the parts substantially as just described.

Paralleling the saw arbor, and extending through the apparatus on each side of the arbor, are elongated guides (shafts) 156, 158. The shafts are journaled in frame 20, in bearings such as bearings 160. The shafts, as brought out below, provide support for the saw arbor between its ends, by reason of the fact that the shafts slidably support the shifter mechanisms discussed, which are mounted in supporting relation on the saw arbor.

More specifically, and first of all considering the construction of a shifter mechanism (reference is now made to FIGS. 2 and 3), each comprises, in addition to inner part 150 already discussed, an outer part 166. Outer part 166 also encircles the saw arbor, and inner part 150 is journaled in the outer part through a bearing assembly 168. Outer part 166 includes radially outwardly projecting arm portions 170, 172, having sleeve portions 174 (see FIG. 1) at the other extremities thereof that slide on shafts 156, 158. The shifter mechanism, through its slidable mounting on shafts 156, 158, functions as a supporting means or member for the saw arbor, which it snugly encircles.

Power-operated means, represented by the power-operated shifter rods 180–185, is provided for moving the shifter mechanisms along the saw arbor, and with the shifter mechanisms the saw mountings and saws connected thereto. A conventional setworks is indicated at 186. The setworks includes the usual fluid-operated rams (not shown) that may be actuated to shift selectively the shifter rods in an axial direction, thus to place them in various adjusted positions.

One shifter rod is connected to each of the shifter mechanisms. Thus, and reference is made to FIGS. 1 and 2, shifter mechanism 126 is secured to shifter rod 180; shifter mechanism 128 is secured to rod 181 (this rod being slidably received in a bore 188 provided in shifter mechanism 126), and shifter mechanism 130 is secured to shifter rod 182 (rod 182 extending through bores similar to bore 188 provided in shifter mechanism 126, 128). Connections similar to those just described are provided between shifter rods 183, 184, and 185, and shifter mechanisms 124, 122, and 120, respectively.

Surrounding shafts 156, 158, and the saw arbor, is casing structure 190, defining a confined fog chamber, indicated at 192. At 194 are indicated nozzle devices, operable to eject a fine spray of lubricant into fog chamber 192. This lubricant collects on the outsides of the various shafts and the saw arbor, and lubricates them, during the operation of the machine.

Shafts 156, 158, during operation of the machine, are rotated under power. Thus, a motor for rotating the shafts is indicated at 196. Motor 196 is connected to shafts 156, 158 by means of chains 197, 198. With the shafts constantly rotated, static friction between the shafts and sleeve portions 174 of the various shifter mechanisms is eliminated. As a result, adjustment in the position of the saws is accomplished without their movement being retarded by static friction acting on the parts supporting the saws.

The operation of the apparatus should be clear from the above description. Material to be cut travels through the apparatus, from left to right in FIG. 1, and over the sawing station is urged against fence or guide 64. The material is urged forwardly and into the saws by the rubber-tired feed roller mechanisms discussed. After cutting, material is shifted out of the machine by power-driven roller mechanism 70. Prior to material entering the sawing station, the saws are properly positioned to produce the desired width of cuts.

On rotation of the saw arbor, the saw collars or mountings are also rotated, with rotation of the saws mounted thereon. The inner parts of the shifter mechanisms rotate with the saw arbor, and these inner parts are supported by the outer parts, which are slidable to and fro on shafts 156, 158.

By using the shifter bars, or keys, along the outside of the saw arbor, as means connecting the mountings and shifter mechanisms, a solid arbor may be provided in the machine. The arbor in turn is supported by the shifters. Thus, deflections and gyrations in the arbor are minimized.

The keys enable the shifter mechanisms to be moved in either of opposite directions, on corresponding movement occurring in the shifter mechanisms. Since the keys or shifter bars are rigid, they remain lodged within the keyways of the saw arbor, without being thrown out on rotation of the arbor. The keys also function as a means transmitting rotation of the arbor to the collars mounted on the arbor.

The apparatus described is entirely practical in operation, and accommodates close spacing of the saws. Narrow pieces may be cut in one pass through the saw machine.

While an embodiment of the invention has been described, it is appreciated that various changes may be made in the parts and/or their organization. It is not intended to be limited to the specific embodiment of the invention disclosed, and it is desired to cover all modifications and variations that would be apparent to one skilled in the art, and that come within the scope of the appended claims.

It is claimed and desired to secure by Letters Patent:

1. In saw apparatus,
   an elongated saw arbor,
   plural axially extending channels disposed circumferentially about the surface of said arbor,
   plural saw mounts mounted in axially spaced relation on said arbor,
   rigid shifter bars extending toward one end of said arbor mounted in said channels,
   means connecting said shifter bars to said saw mounts with a different bar being connected to different ones of said saw mounts, and
   means adjacent said one end of said arbor for moving said bars selectively,
   movement of a bar being operable to produce movement of the saw mount connected thereto.

2. The saw apparatus of claim 1, wherein the means adjacent said one end of said arbor for moving the bars comprises plural saw shifter mechanisms, each connected to different ones of said shifter bars, and wherein certain ones of the shifter bars extend from one side to the other and thus through certain ones of said shifter mechanisms with relative movement afforded between the bars and the shifter mechanisms.

3. In saw apparatus,
   an elongated saw arbor and means journaling the arbor adjacent its opposite ends,
   at least one elongated guide substantially paralleling said arbor and mounted radially to one side of the arbor,
   a supporting member mounted on said elongated guide for movement on the guide and relative to the means journaling the arbor adjacent its opposite ends, in a direction paralleling the arbor,
   means mounting the supporting member on the arbor whereby the member supports the arbor,
   a saw mount axially shiftable on said arbor spaced axially to one side of said supporting member, and
   means connecting the means mounting the supporting member on the arbor and said saw mount whereby axial movement of the former produces corresponding axial movement in the latter.

4. In saw apparatus,
   a rotatable power-driven saw arbor and means journaling the arbor adjacent its ends,
   an arbor-supporting member movable relative to the means journaling the arbor adjacent its ends and to and fro in a path paralleling the axis of said arbor,
   said arbor-supporting member including an outer part and means mounting said outer part of the supporting member on said arbor accommodating such movement,
   said means mounting said outer part of the supporting member on said arbor comprising an inner part connected to the arbor to be rotatable with the arbor which is journaled in said outer part, means to one side of said arbor guiding said outer part during movement of the supporting member, a saw mount mounted on the arbor and spaced axially from said inner part, and means connecting said inner part and saw mount whereby movement of the former produces a corresponding movement in the latter.

5. In saw apparatus, means defining an enclosed lubricating fog chamber, a power-driven rotatable saw arbor extending through said chamber, bearings journaling said arbor at points spaced axially on the arbor, a power-driven rotatable guide shaft paralleling said arbor and extending through said chamber, supporting means journaled on said guide shaft and also journaled on said arbor at a location disposed between said bearings, and movable axially of the shaft and arbor and relative to said bearings, said supporting means providing a connection between said shaft and arbor whereby the shaft supports the arbor, means for mounting a saw mounted on said arbor, and means operatively connecting said supporting means and said means for mounting a saw whereby movement of the former in a direction paralleling the saw arbor produces a corresponding movement in the latter.

6. The saw apparatus of claim 5, wherein said supporting means comprises an inner part and a relatively rotatable outer part, said inner part being mounted on the arbor so as to be rotatable with the arbor.

7. In saw apparatus, a power-driven rotatable saw arbor, at least a pair of keyways extending axially along the outside of said arbor and circumferentially spaced on said arbor, a key seated within each of said keyways, at least a pair of saw mounts mounted on the outside of said arbor and movable axially therealong, means securing a key to each of said saw mounts, and axially movable shifter mechanisms secured to each key disposed axially to one side of said saw mounts, said shifter mechanisms on axial movement being operable to move said saw mounts.

8. In saw apparatus, a frame, a power-driven saw arbor, first and second bearings mounted on said frame journaling axially spaced portions of said arbor, a collar adapted to mount a saw encircling said arbor disposed between said first and second bearings, shiftable in one axial direction on the arbor away from one bearing toward the other bearing, and in the opposite axial direction away from said other toward said one bearing, a channel extending axially along the outside of said arbor, an elongated rigid, compression-transmitting shifter bar snugly seated within said channel extending axially along said arbor, said bar being connected adjacent to one end to said collar, and means movable relative to said first and second bearings, and axially of the arbor, connected to the shifter bar adjacent the end opposite its said one end, for shifting the collar in an axial direction to and fro on said arbor between said bearings.

9. In saw apparatus, a frame, a power-driven saw arbor, first and second bearings mounted on the frame journaling axially spaced portions of the arbor, means for mounting a saw disposed between said bearings and mounted on the arbor, the latter means being movable relative to the bearings and axially on the arbor, a pair of supporting shafts paralleling said arbor and offset radially therefrom, shifter mechanism disposed between said bearings mounted on said pair of shafts and slidable along the length thereof, said shifter mechanism including means supporting said arbor between said bearings and being movable axially of said arbor relative to said bearings, and an elongated compression-transmitting shifter bar extending axially along the outside of the arbor connected adjacent one end to the shifter mechanism and adjacent the end opposite said one end to the means for mounting the saw, said bar on movement of the shifter mechanism along said pair of shafts being operable to produce corresponding movement in the means for mounting a saw.

10. In saw apparatus, a frame, a power-driven saw arbor, first and second bearings mounted on the frame journaling axially spaced portions of said arbor, means for mounting a saw disposed between the bearings, and movable relative to the arbor and each of said bearings, shifter mechanism supporting the arbor disposed between said means for mounting a saw and one of said bearings, said shifter mechanism being spaced axially on the arbor from the means for mounting a saw, and being axially shiftable along said arbor and relative to said bearings, said shifter mechanism including an inner part mounted on the arbor for rotation therewith, and a nonrotatable outer part supporting the inner part within which said inner part is journaled, guide means for guiding said outer part of the shifter mechanism as the same is shifted axially of the arbor, and means operatively connecting the inner part of the shifter mechanism and means for mounting a saw, whereby movement of the shifter mechanism axially on the arbor produces a corresponding movement in the means for mounting a saw.

References Cited by the Examiner
UNITED STATES PATENTS

| | | | |
|---|---|---|---|
| 700,203 | 5/02 | Johnson | 143—37 |
| 1,682,045 | 8/28 | Hollmann | 93—80 |
| 1,738,145 | 12/29 | Hulbert | 143—37 |
| 1,766,663 | 6/30 | McClure | 143—158 |
| 2,426,727 | 9/47 | Curle et al. | 143—37 |

LESTER M. SWINGLE, *Primary Examiner.*

WILLIAM W. DYER, Jr., *Examiner.*